(12) United States Patent
Gan et al.

(10) Patent No.: US 6,919,141 B2
(45) Date of Patent: Jul. 19, 2005

(54) PHOSPHATE ADDITIVES FOR NONAQUEOUS ELECTROLYTE RECHARGEABLE ELECTROCHEMICAL CELLS

(75) Inventors: Hong Gan, East Amherst, NY (US); Esther S. Takeuchi, East Amherst, NY (US); Robert Rubino, Williamsville, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 359 days.

(21) Appl. No.: 10/251,137

(22) Filed: Sep. 20, 2002

(65) Prior Publication Data

US 2003/0113635 A1 Jun. 19, 2003

Related U.S. Application Data

(63) Continuation-in-part of application No. 09/723,059, filed on Nov. 27, 2000, now abandoned, which is a continuation-in-part of application No. 09/303,877, filed on May 3, 1999, now Pat. No. 6,203,942.

(60) Provisional application No. 60/105,279, filed on Oct. 22, 1998.

(51) Int. Cl.$^7$ ............................. H01M 6/04; H01M 4/60
(52) U.S. Cl. .................... 429/203; 429/215; 429/218.1; 429/231.1; 429/231.8; 429/231.4; 429/231.5; 429/330; 429/332; 429/338; 429/326; 429/232; 429/217; 429/342; 429/220; 429/221; 429/223; 429/224; 429/329
(58) Field of Search ................................. 429/203, 215, 429/218.1, 231.1, 231.8, 326, 330, 332, 338, 231.4, 231.5, 220, 221, 223, 224, 232, 342, 217

(56) References Cited

U.S. PATENT DOCUMENTS

| | | | |
|---|---|---|---|
| 5,219,675 A | 6/1993 | Kamide et al. | 429/46 |
| 5,350,648 A | 9/1994 | Kagawa et al. | 429/218 |
| 5,455,127 A | 10/1995 | Olsen et al. | 429/192 |
| 5,478,674 A | 12/1995 | Miyaska | 429/218 |
| 5,506,078 A | 4/1996 | Davidson et al. | 429/224 |
| 5,545,497 A | 8/1996 | Takeuchi et al. | 429/219 |
| 5,580,684 A | 12/1996 | Yokoyama et al. | 429/194 |
| 5,614,331 A | 3/1997 | Takeuchi et al. | 429/9 |
| 5,639,577 A | 6/1997 | Takeuchi et al. | 429/219 |
| 5,654,114 A | 8/1997 | Kubota et al. | 429/218 |
| 5,691,084 A | 11/1997 | Kita et al. | 429/194 |
| 5,714,277 A | 2/1998 | Kawakami | 429/62 |
| 5,783,333 A | 7/1998 | Mayer | 429/223 |
| 5,830,600 A | 11/1998 | Narang et al. | 429/193 |
| 6,203,942 B1 | 3/2001 | Gan et al. | 429/203 |

FOREIGN PATENT DOCUMENTS

| | | |
|---|---|---|
| EP | 0631339 A2 | 3/1994 |
| EP | 0696077 A2 | 7/1995 |
| EP | 0698933 A1 | 7/1995 |
| EP | 0918364 A | 5/1999 |
| EP | 1005098 A2 | 5/2000 |
| EP | 1050914 A1 | 11/2000 |
| JP | 2244565 | 9/1990 |
| JP | HEI7114940 | 5/1995 |
| JP | 8162153 | 6/1996 |
| JP | H8-1612153 | 6/1996 |
| JP | H9-115546 | 5/1997 |
| JP | 9115546 | 5/1997 |
| JP | XP002145471 | 11/1998 |

OTHER PUBLICATIONS

Patent Abstracts of Japan, vol. 1998, No. 14, Dec. 31, 1998 * JP 10 255839 A (Matsushita Electric Ind Co Ltd), Sep. 25, 1998.
Patent Abstracts of Japan, vol. 1998, No. 13, Nov. 30, 1998 & JP 10 228928 A (Denso Corp; Asahi Denka Kogyo KK), Aug. 25, 1998 and Translation.
Patent Abstracts of Japan, vol. 2000, No. 02, Feb. 29, 2000 & JP 11 317232 A (Mitsubishi Chemical Corp), Nov. 16, 1999.
Patent Abstract of Japan, vol. 1998, No. 1, Jan. 30, 1998 & JP 09 245830 A (Toshiba Corp), Sep. 19, 1997.
Anode Passivation and Electrolyte Solvent Disproportion: Mechanism of Ester Exchange Reaction in Lithium–Ion Batteries, J. Electrochem. Soc., vol. 144, No. 6, Jun. 1997 © The Electrochemical Society, Inc., Esther S. Takeuchi, Hong Gan, Marcus Palazzo, Randolph A. Leising, and Steven M. Davis.

*Primary Examiner*—Laura Weiner
(74) *Attorney, Agent, or Firm*—Michael F. Scalise

(57) ABSTRACT

A lithium ion electrochemical cell having high charge/discharge capacity, long cycle life and exhibiting a reduced first cycle irreversible capacity, is described. The stated benefits are realized by the addition of at least one phosphate additive having the formula: $(R^1O)P(=O)(OR^2)(OR^3)$ and wherein $R^1$, $R^2$ and $R^3$ are the same or different, wherein at least one, but not all three, of the R groups is hydrogen, or at least one of the R groups has at least 3 carbon atoms and contains an sp or $sp^2$ hybridized carbon atom bonded to an $sp^3$ hybridized carbon atom bonded to the oxygen atom bonded to the phosphorous atom.

35 Claims, 1 Drawing Sheet

PHOSPHATE ADDITIVES FOR NONAQUEOUS ELECTROLYTE RECHARGEABLE ELECTROCHEMICAL CELLS

CROSS-REFERENCE TO RELATED APPLICATION

The present application is a continuation-in-part of application Ser. No. 09/723,059 filed on Nov. 27, 2000, now abandoned, which is a continuation-in-part of application Ser. No. 09/303,877 filed on May 3, 1999, now U.S. Pat. No. 6,203,942 to Gan et al., which claims priority based on U.S. provisional application Ser. No. 60/105,279, filed Oct. 22, 1998.

BACKGROUND OF INVENTION

The present invention generally relates to an alkali metal electrochemical cell, and more particularly, to a rechargeable alkali metal cell. Still more particularly, the present invention relates to a lithium ion electrochemical cell activated with an electrolyte having an additive provided to achieve high charge/discharge capacity, long cycle life and to minimize the first cycle irreversible capacity. According to the present invention, the preferred additive to the activating electrolyte is a phosphate compound.

Alkali metal rechargeable cells typically comprise a carbonaceous anode electrode and a lithiated cathode electrode. Due to the high potential of the cathode material (up to 4.3V vs. $Li/Li^+$ for $Li_{1-x}CoO_2$) and the low potential of the carbonaceous anode material (0.01V vs. $Li/Li^+$ for graphite) in a fully charged lithium ion cell, the choice of the electrolyte solvent system is limited. Since carbonate solvents have high oxidative stability toward typically used lithiated cathode materials and good kinetic stability toward carbonaceous anode materials, they are generally used in lithium ion cell electrolytes. To achieve optimum cell performance (high rate capability and long cycle life), solvent systems containing a mixture of a cyclic carbonate (high dielectric constant solvent) and a linear carbonate (low viscosity solvent) are typically used in commercial secondary cells. Cells with carbonate-based electrolytes are known to deliver more than 1,000 charge/discharge cycles at room temperature.

One aspect of the present invention involves the provision of ethylene carbonate (EC), dimethyl carbonate (DMC), ethyl methyl carbonate (EMC) and diethyl carbonate (DEC) as a quaternary solvent system for the activating electrolyte. Lithium ion cells with such electrolyte systems are capable of discharge at temperatures down to as low as −40° C. while exhibiting good cycling characteristics. However, lithium ion cell design generally involves a trade off in one area for a necessary improvement in another, depending on the targeted cell application. The achievement of a lithium-ion cell capable of low temperature cycleability by use of the above quaternary solvent electrolyte, in place of a typically used binary solvent electrolyte (such as 1.0M $LiPF_6$/EC:DMC=30:70, v/v which freezes at −11° C.), is obtained at the expense of increased first cycle irreversible capacity during the initial charging (approximately 65 mAh/g graphite for 1.0M $LiPF_6$/EC:DMC:EMC:DEC=45:22:24.8:8.2 vs. 35 mAh/g graphite for 1.0M $LiPF_6$/EC:DMC=30:70). Due to the existence of this first cycle irreversible capacity, lithium ion cells are generally cathode limited. Since all of the lithium ions, which shuttle between the anode and the cathode during charging and discharging originally come from the lithiated cathode, the larger the first cycle irreversible capacity, the lower the cell capacity in subsequent cycles and the lower the cell efficiency. Thus, it is desirable to minimize or even eliminate the first cycle irreversible capacity in lithium ion cells while at the same time maintaining the low temperature cycling capability of such cells.

According to the present invention, these objectives are achieved by providing an inorganic or organic phosphate in the quaternary solvent electrolyte. Lithium ion cells activated with these electrolytes exhibit lower first cycle irreversible capacities relative to cells activated with the same quaternary solvent electrolyte devoid of the phosphate additive. As a result, cells including the phosphate additive present higher subsequent cycling capacity than control cells. The cycleability of the present invention cells at room temperature, as well as at low temperatures, i.e., down to about −20° C., is as good as cells activated with the quaternary electrolyte devoid of a phosphate additive.

SUMMARY OF THE INVENTION

It is commonly known that when an electrical potential is initially applied to lithium ion cells constructed with a carbon anode in a discharged condition to charge the cell, some permanent capacity loss occurs due to the anode surface passivation film formation. This permanent capacity loss is called first cycle irreversible capacity. The film formation process, however, is highly dependent on the reactivity of the electrolyte components at the cell charging potentials. The electrochemical properties of the passivation film are also dependent on the chemical composition of the surface film.

The formation of a surface film is unavoidable for alkali metal systems, and in particular, lithium metal anodes, and lithium intercalated carbon anodes due to the relatively low potential and high reactivity of lithium toward organic electrolytes. The ideal surface film, known as the solid-electrolyte interphase (SEI), should be electrically insulating and ionically conducting. While most alkali metal, and in particular, lithium electrochemical systems meet the first requirement, the second requirement is difficult to achieve. The resistance of these films is not negligible, and as a result, impedance builds up inside the cell due to this surface layer formation that induces unacceptable polarization during the charge and discharge of the lithium ion cell. On the other hand, if the SEI film is electrically conductive, the electrolyte decomposition reaction on the anode surface does not stop due to the low potential of the lithiated carbon electrode.

Hence, the composition of the electrolyte has a significant influence on the discharge efficiency of alkali metal systems, and particularly the permanent capacity loss in secondary cells. For example, when 1.0M $LiPF_6$/EC:DMC=30:70 is used to activate a secondary cell, the first cycle irreversible capacity is approximately 35 mAh/g of graphite. However, under the same cycling conditions, the first cycle irreversible capacity is found to be approximately 65 mAh/g of graphite when 1.0M $LiPF_6$/EC:DMC:EMC:DEC=45:22:24.8:8.2 is used as the electrolyte. In contrast, lithium ion cells activated with the binary solvent electrolyte of ethylene carbonate and dimethyl carbonate cannot be cycled at temperatures less than about −11° C. The quaternary solvent electrolyte of EC, DMC, EMC and DEC, which enables lithium ion cells to cycle at much lower temperatures, is a compromise in terms of providing a wider temperature application with acceptable cycling efficiencies. It would be highly desirable to retain the benefits of a lithium ion cell capable of operating at temperatures down to as low as about −40° C. while minimizing the first cycle irreversible capacity.

According to the present invention, this objective is achieved by adding a phosphate additive in the above-described quaternary solvent electrolytes. In addition, this invention may be generalized to other nonaqueous organic electrolyte systems, such as binary solvent and ternary solvent systems, as well as the electrolyte systems containing solvents other than mixtures of linear or cyclic carbonates. For example, linear or cyclic ethers or esters may also be included as electrolyte components. Although the exact reason for the observed improvement is not clear, it is hypothesized that the phosphate additive competes with the existing electrolyte components to react on the carbon anode surface during initial lithiation to form a beneficial SEI film. The thusly-formed SEI film is electrically more insulating than the film formed without the phosphate additive and, as a consequence, the lithiated carbon electrode is better protected from reactions with other electrolyte components. Therefore, lower first cycle irreversible capacity is obtained.

These and other objects of the present invention will become increasingly more apparent to those skilled in the art by reference to the following description and the appended drawing.

DETAILED DESCRIPTION OF THE PREFERRED EMBODIMENTS

Figure 1:
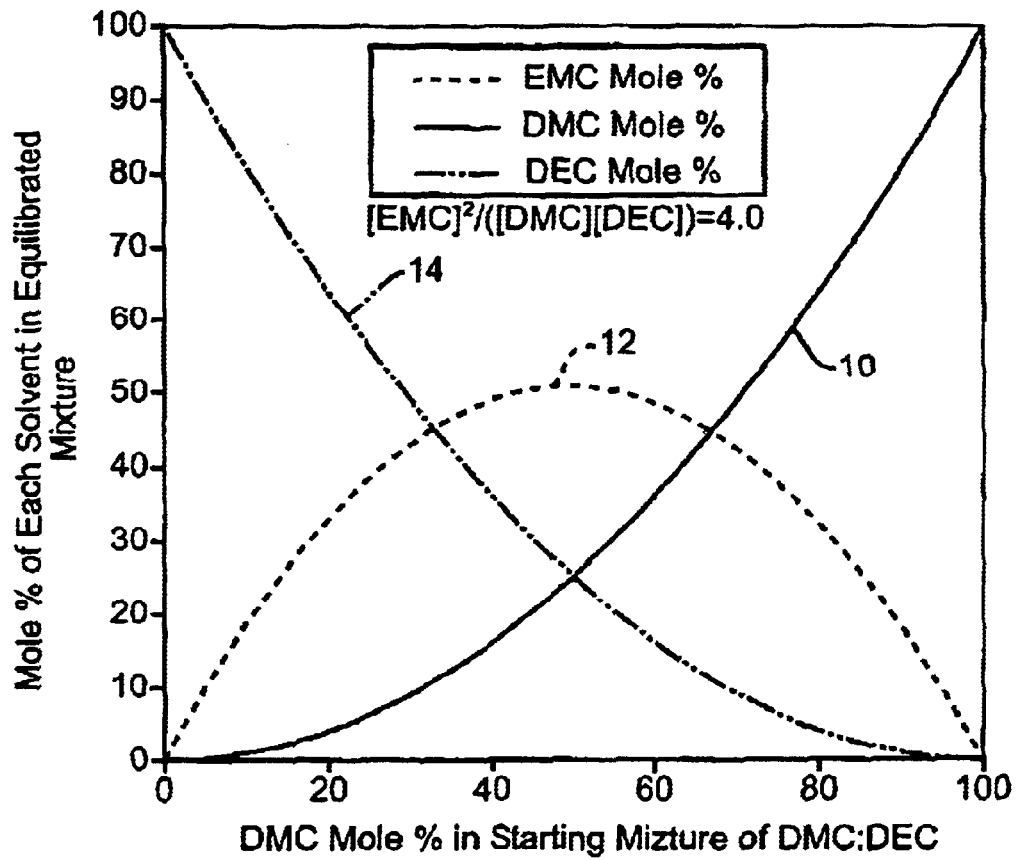
FIG. 1 is a graph of equilibrated molar mixtures of DMC:EMC:DEC based on a starting mixture of DMC:DEC.

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode electrode comprises a material capable of intercalating and de-intercalating the alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, fibers of the carbonaceous material are particularly advantageous because the fibers have excellent mechanical properties that permit them to be fabricated into rigid electrodes capable of withstanding degradation during repeated charge/discharge cycling. Moreover, the high surface area of carbon fibers allows for rapid charge/discharge rates. A preferred carbonaceous material for the anode of a secondary electrochemical cell is described in U.S. Pat. No. 5,443,928 to Takeuchi et al., which is assigned to the assignee of the present invention and incorporated herein by reference.

A typical secondary cell anode is fabricated by mixing about 90 to 97 weight percent graphite with about 3 to 10 weight percent of a binder material which is preferably a fluoro-resin powder such as polytetrafluoroethylene (PTFE), polyvinylidene fluoride (PVDF), polyethylenetetrafluoroethylene (ETFE), polyamides and polyimides, and mixtures thereof. This electrode active admixture is provided on a current collector such as of a nickel, stainless steel, or copper foil or screen by casting, pressing, rolling or otherwise contacting the active admixture thereto.

The anode component further has an extended tab or lead of the same material as the anode current collector, i.e., preferably nickel, integrally formed therewith such as by welding and contacted by a weld to a cell case of conductive metal in a case-negative electrical configuration. Alternatively, the carbonaceous anode may be formed in some other geometry, such as a bobbin shape, cylinder or pellet to allow an alternate low surface cell design.

The cathode of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

The lithiated active material is preferably mixed with a conductive additive selected from acetylene black, carbon black, graphite, and powdered metals of nickel, aluminum, titanium and stainless steel. The electrode further comprises a fluoro-resin binder, preferably in a powder form, such as PTFE, PVDF, ETFE, polyamides and polyimides, and mixtures thereof. The current collector is selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

To recharge such secondary cells, lithium ions from the cathode are intercalated into the carbonaceous anode by applying an externally generated electrical potential to recharge the cell. The applied recharging potential serves to draw the lithium ions from the cathode material, through the electrolyte and into the carbonaceous anode to saturate the carbon comprising the anode. The resulting $Li_xC_6$ electrode can have an x ranging between 0.1 and 1.0. The cell is then provided with an electrical potential and discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, copper silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air.

The secondary cell of the present invention includes a separator to provide physical segregation between the anode and cathode active electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. The form of the separator typically is a sheet that is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetraflouroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The choice of an electrolyte solvent system for activating an alkali metal electrochemical cell, and particularly a fully charged lithium ion cell is very limited due to the high potential of the cathode material (up to 4.3V vs. Li/Li$^+$ for Li$_{1-x}$CoO$_2$) and the low potential of the anode material (0.01V vs. Li/Li$^+$ for graphite). According to the present invention, suitable nonaqueous electrolytes are comprised of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

Preferred electrolytes according to the present invention comprise solvent mixtures of EC:DMC:EMC:DEC. Most preferred molar percentages for the various carbonate solvents include EC in the range of about 10% to about 50%; DMC in the range of about 5% to about 75%; EMC in the range of about 5% to about 50%; and DEC in the range of about 3% to about 45%. However, in formulating a quaternary mixed solvent system for an electrolyte activating a lithium ion cell according to the present invention, it is important that DMC, EMC and DEC are essentially at an equilibrium molar condition from the beginning so that the electrolyte does not undergo significant chemical decomposition during cell cycling.

The reason for this is that as the cell cycles between a discharged and a charged state, DMC and DEC undergo an ester exchange reaction to produce product EMC. Also, EMC disproportionates to DMC and DEC during cell cycling. If the ternary solvents of DMC:EMC:DEC are not filled into the cell in an essentially equilibrated molar mixture, cell performance changes as DMC and DEC react to form EMC, and EMC disproportionates to form DMC and DEC. In that light, a cell which is initially rated for discharge at, for example, −20° C. would not be capable of such performance after several cycles as the molar ratio of EMC:DMC:DEC changes in an ester exchange reaction or a disproportionation reaction. Such unpredictability is not acceptable in a lithium ion cell.

Given a starting mixture of DEC and DMC, there are a fixed number of ethoxy and methoxy groups that will exchange under equilibrium conditions. The extent of exchange is determined by the relative energies of the reactants (DEC and DMC) and the product (EMC). In this case, the reactants and product are very similar structurally and energetically. Therefore, the equilibrium constant is consistent with a random distribution of ethoxy and methoxy groups in the reaction mixture. For example, in the case of a 50:50 mixture of DMC and DEC, there are an equal number of ethoxy and methoxy groups. This means there is a 25% chance of two ethoxy groups combining to give DEC, a 25% chance of two methoxy groups combining to give DMC, and a 50% chance of an ethoxy group and a methoxy group combining to give EMC at a relative concentration of DMC:DEC:EMC of 1:1:2. This means that a "k" constant for an essentially equilibrated molar mixture is calculated as [EMC]$^2$/([DMC][DEC]) or 4 [2$^2$/(1×1)]. Since the equilibrium constant is independent of the initial concentrations of the reactants, this constant is valid for any starting mixture of DMC and DEC. In that respect, a suitable range for the k constant for an essentially equilibrated molar mixture of DMC, EMC and DEC according to the present invention is about 3.85 to about 4.15 or about 4.0±0.15, more preferably about 3.95 to about 4.05, and most preferably about 4.0.

FIG. 1 is a graph showing various equilibrated molar mixtures of DMC:EMC:DEC based on a starting ratio of DMC:DEC. For example, reading from left to right on the x-axis or abscissa of FIG. 1, if the beginning DMC% (molar) in an initial DMC:DEC mixture is about 25.0% DMC, the exemplary starting mixture of DMC:DEC begins as about 25.0% DMC:75.0% DEC. A line is then drawn from this point parallel to the y-axis, intersecting curves 10, 12 and 14 for the respective molar percentages in the equilibrated mixture of DMC, EMC and DEC. This starting mixture equilibrates to a molar mixture (read on the y-axis or ordinate) of about 6.2% DMC, 37.5% EMC and 56.3% DEC. This equilibrated mixture no. 1 and those of two other exemplary mixtures from the graph of FIG. 1 are set forth in Table 1 below.

TABLE 1

| Mixture No. | DMC % (molar) in initial DMC:DEC Mixture | Resulting Equilibrated Mixture of DMC:EMC:DEC |
|---|---|---|
| 1 | 25:75 | 6.2:37.5:56.3 |
| 2 | 50:50 | 25:50:25 |
| 3 | 75:25 | 56.3:37.5:6.2 |

After the constituents EMC, DMC and DEC are provided in the electrolyte in an essentially equilibrated molar mixture, ethylene carbonate is added to tailor the cell to a particular application.

Electrolytes containing this quaternary carbonate mixture exhibit freezing points below −50° C., and lithium ion cells activated with such mixtures have very good cycling behavior at room temperature as well as very good discharge and charge/discharge cycling behavior at temperatures below −20° C.

Known lithium salts that are useful as a vehicle for transport of alkali metal ions from the anode to the cathode, and back again include LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiNO$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$, LiCF$_3$SO$_3$, and mixtures thereof. Suitable salt concentrations typically range between about 0.8 to 1.5 molar.

In accordance with the present invention, at least one organic phosphate additive is provided as a co-solvent in the electrolyte solution of the previously described alkali metal ion or rechargeable electrochemical cell. The phosphate additive preferably has the general formula (R$^1$O)P(=O)(OR$^2$)(OR$^3$) wherein R$^1$, R$^2$ and R$^3$ are the same or different, and wherein at least one, but not all three, of the R groups is at least one of the group consisting of: a hydrogen; one that contains at least three carbon atoms and has a first structure of the type C(sp)-C(sp³), wherein the C(Sp³) is directly connected to the —OPO— functional group; and one that contains at least three carbon atoms and has a second structure of the type C(sp²)-C(sp³), wherein the C(Sp³) is directly connected to the —OPO— functional group.

Examples of phosphate compounds having at least one substituent containing the bond structure of C(sp²)-C(sp³)—O—P(=O)(OR)² include the following:

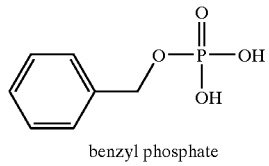
benzyl phosphate

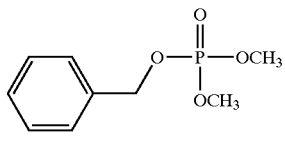
benzyl dimethyl phosphate

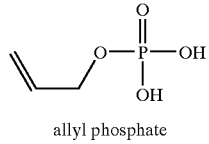
allyl phosphate

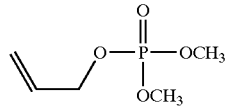
allyl dimethyl phosphate

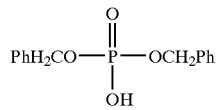
dibenzyl phosphate

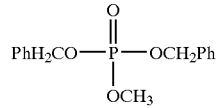
dibenzyl methyl phosphate

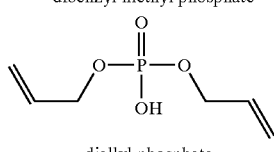
diallyl phosphate

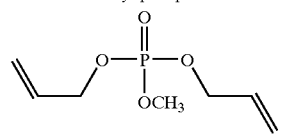
diallyl methyl phosphate

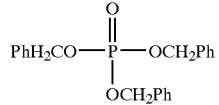
tribenzyl phosphate

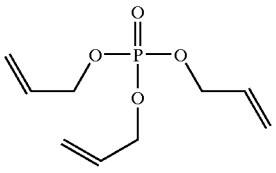
triallyl phosphate

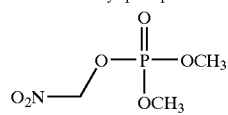
dimethyl nitromethyl phosphate

Examples of phosphate compounds having at least one substituent containing the bond structure of C(sp)-C(sp³)—O—P(=O)(OR)² include the following:

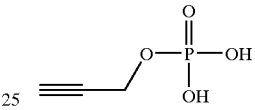
propargyl phosphate

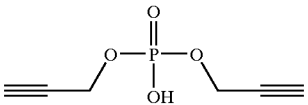
dipropargyl phosphate

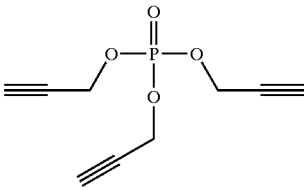
tripropargyl phosphate

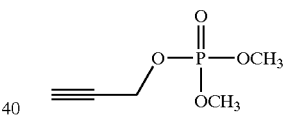
dimethyl propargyl phosphate

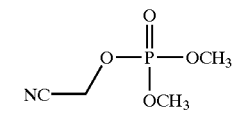
cyanomethyl dimethyl phosphate

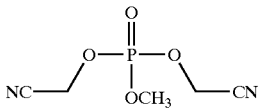
di(cyanomethyl)methyl phosphate

The above-described compounds are only intended to be exemplary of those that are useful with the present invention, and are not to be construed as limiting. Those skilled in the art will readily recognize phosphate compounds that come under the purview of the general formula set forth above and which will be useful as additives for the electrolyte to achieve high charge/discharge capacity, long cycle life and to minimize the first cycle irreversible capacity according to the present invention.

While not intended to be bound by any particular theory, it is believed that the formation of O=P—(O—Li)$_n$(OR)$_m$ (n=1 to 3; m=0 to 2) deposited on the anode surface is responsible for the improved performance of the lithium-ion cells. In the case of a strong O—R bond (R=methyl or phenyl for example), the reduction of the phosphate additive by the lithium anode does not result in the O—R bond cleavage to form an O—Li salt product. In contrast, if at least one, but not all three of the R groups in the phosphate additive is hydrogen (acidic proton), the additive will react with lithium metal or lithiated carbon to form an O—Li bond directly. In addition, if at least one of the R groups is activated by having an sp or $sp^2$ hybridized carbon atoms bonded to an $sp^3$ hybridized carbon atoms bonded to an oxygen atom bonded to the phosphorous atom, the O—R bond is relatively weak. During reduction, the O—R bond breaks to form a product containing the P—O—Li salt group. This anode surface film is ionically more conductive than the film formed in the absence of the additives and is responsible for the improved performance of the lithium-ion cell.

The concentration limit for the phosphate additive is preferably about 0.001M to about 0.40M. The beneficial effect of the phosphate additive will not be apparent if the additive concentration is less than about 0.001M. On the other hand, if the additive concentration is greater than about 0.40M, the beneficial effect of the additive will be canceled by the detrimental effect of higher internal cell resistance due to the thicker anode surface film formation and lower electrolyte conductivity.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising at least one of the phosphate additives described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

It is appreciated that various modifications to the inventive concepts described herein may be apparent to those of ordinary skill in the art without departing from the spirit and scope of the present invention as defined by the appended claims.

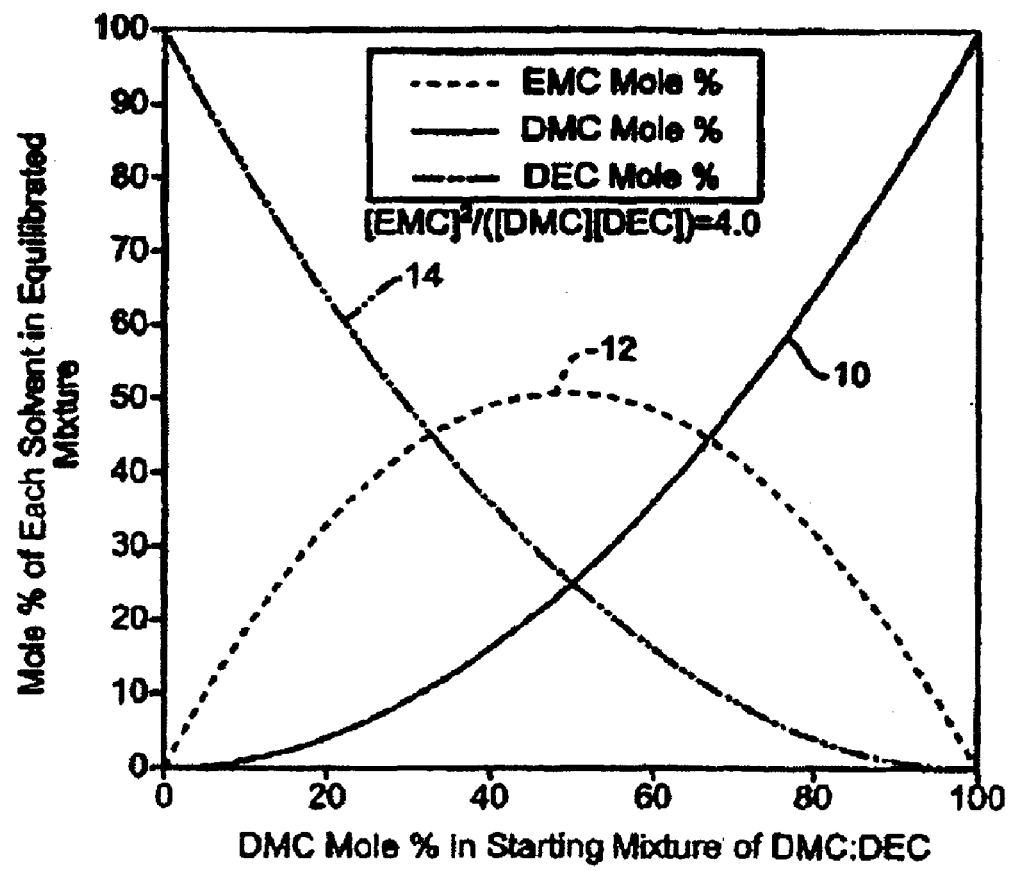

What is claimed is:

1. An electrochemical cell, which comprises:
  a) a negative electrode which intercalates with an alkali metal;
  b) a positive electrode comprising an electrode active material which intercalates with the alkali metal;
  c) a nonaqueous electrolyte activating the negative and the positive electrodes;
  d) a phosphate additive provided in the electrolyte, wherein the phosphate additive has the formula: $(R^1O)P(=O)(OR^2)(OR^3)$ with $R^1$, $R^2$ and $R^3$ being the same or different, wherein at least one of the R groups contains:
    i) at least three carbon atoms and has a first structure of the type $C(sp)-C(sp^3)$, wherein the $C(sp^3)$ is directly connected to the —OPO— functional group; or
    ii) at least three carbon atoms and has a second structure of the type $C(sp^2)-C(sp^3)$, wherein the $C(sp^3)$ is directly connected to the —OPO— functional group; and
  e) any remaining R group that is not i) or ii) is selected from the group consisting of hydrogen, saturated organic groups containing 1 to 13 carbon atoms, and unsaturated organic groups containing 2 to 13 carbon atoms.

2. The electrochemical cell of claim 1 wherein the phosphate additive is selected from the group consisting of benzyl phosphate, benzyl dimethyl phosphate, allyl phosphate, ally dimethyl phosphate, dibenzyl phosphate, dibenzyl methyl phosphate, diallyl phosphate, diallyl methyl phosphate, tribenzyl phosphate, triallyl phosphate, dimethyl nitromethyl phosphate, propargyl phosphate, dipropargyl phosphate, tripropargyl phosphate, dimethyl propargyl phosphate, cyanomethyl dimethyl phosphate, di (cyanomethyl) methyl phosphate, and mixtures thereof.

3. The electrochemical cell of claim 1 wherein the phosphate additive is present in the electrolyte in a range of about 0.001M to about 0.40M.

4. The electrochemical cell of claim 1 wherein the electrolyte includes a quaternary, nonaqueous carbonate solvent mixture.

5. The electrochemical cell of claim 1 wherein the electrolyte comprises at least one linear carbonate selected from the group consisting of dimethyl carbonate, diethyl carbonate, dipropyl carbonate, ethyl methyl carbonate, methyl propyl carbonate, ethyl propyl carbonate, and mixtures thereof.

6. The electrochemical cell of claim 5 wherein the electrolyte comprises at least three of the linear carbonates.

7. The electrochemical cell of claim 1 wherein the electrolyte comprises at least one cyclic carbonate selected from the group consisting of ethylene carbonate, propylene carbonate, butylene carbonate, vinylene carbonate, and mixtures thereof.

8. The electrochemical cell of claim 1 wherein the electrolyte includes a carbonate mixture of dimethyl carbonate (DMC), ethyl methyl carbonate (EMC) and diethyl carbonate (DEC), wherein with the negative electrode deintercalated with the alkali metal and the positive electrode intercalated with the alkali metal before being activated with the electrolyte, the dimethyl carbonate, ethyl methyl carbonate and diethyl carbonate are in an essentially equilibrated molar mixture as determined by the graph of FIG. 1, wherein from a beginning molar mixture of DMC and DEC solvents in a ratio of a% of DMC and 1-a% of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC, and wherein the cell is repeatedly cyclable between a discharged and a charged state with the dimethyl carbonate, the ethyl methyl carbonate and the diethyl carbonate remaining in the equilibrated molar mixture and wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

9. The electrochemical cell of claim 1 wherein the electrolyte comprises ethylene carbonate in the range of about 20% to about 50%, dimethyl carbonate in the range of about 12% to about 75%, ethyl methyl carbonate in the range of about 5% to about 45%, and diethyl carbonate in the range of about 3% to about 45%, by molar.

10. The electrochemical cell of claim 1 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

11. The electrochemical cell of claim 1 wherein the alkali metal is lithium.

12. The electrochemical cell of claim 1 wherein the negative electrode comprises a negative electrode active material selected from the group consisting of coke, carbon black, graphite, acetylene black, carbon fibers, glassy carbon, and mixtures thereof.

13. The electrochemical cell of claim 1 wherein the negative electrode active material is mixed with a fluoro-resin binder.

14. The electrochemical cell of claim 1 wherein the positive electrode comprises a positive electrode active material selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

15. The electrochemical cell of claim 14 wherein the positive electrode active material is mixed with a fluoro-resin binder.

16. The electrochemical cell of claim 14 wherein the positive electrode active material is mixed with a conductive additive selected from the group consisting of acetylene black, carbon black, graphite, nickel powder, aluminum powder, titanium powder, stainless steel powder, and mixtures thereof.

17. An electrochemical cell, which comprises:
a) a negative electrode which intercalates with lithium;
b) a positive electrode comprising an electrode active material and which intercalates with lithium;
c) an electrolyte solution activating the anode and the cathode, the electrolyte including a carbonate mixture of dimethyl carbonate (DMC), ethyl methyl carbonate (EMC) and diethyl carbonate (DEC), wherein with the negative electrode deintercalated with the lithium and the positive electrode intercalated with the lithium before being activated with the electrolyte, the dimethyl carbonate, ethyl methyl carbonate and diethyl carbonate are in an essentially equilibrated molar mixture as determined by the graph of FIG. 1, wherein from a beginning molar ratio of z(DMC) and z(DEC) entered on the abscissa of the graph and then moving up the y-intersect to curve 10 as the equilibrated molar percentage of DMC, curve 12 as the equilibrated molar percentage of EMC and curve 14 as the equilibrated molar percentage of DEC in the equilibrated molar mixture;

d) a phosphate additive provided in the electrolyte, wherein the phosphate additive has the formula: $(R^1O)P(=O)(OR^2)(OR^3)$ with $R^1$, $R^2$ and $R^3$ being the same or different, wherein at least one of the R groups contains:
  i) at least three carbon atoms and has a first structure of the type $C(sp)-C(sp^3)$, wherein the $C(sp^3)$ is directly connected to the —OPO— functional group; or
  ii) at least three carbon atoms and has a second structure of the type $C(sp^2)-C(sp^3)$, wherein the $C(sp^3)$ is directly connected to the —OPO— functional group; and e) any remaining R group that is not i) or ii) is selected from the group consisting of hydrogen, saturated organic groups containing 1 to 13 carbon atoms, and unsaturated organic groups containing 2 to 13 carbon atoms; and f) wherein the cell is repeatedly cyclable between a discharged and a charged state with the dimethyl carbonate, the ethyl methyl carbonate and the diethyl carbonate remaining in the equilibrated molar mixture and wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

18. The electrochemical cell of claim 17 wherein the phosphate additive is selected from the group consisting of benzyl phosphate, benzyl dimethyl phosphate, allyl phosphate, ally dimethyl phosphate, dibenzyl phosphate, dibenzyl methyl phosphate, diallyl phosphate, diallyl methyl phosphate, tribenzyl phosphate, triallyl phosphate, dimethyl nitromethyl phosphate, propargyl phosphate, dipropargyl phosphate, tripropargyl phosphate, dimethyl propargyl phosphate, cyanomethyl dimethyl phosphate, di (cyanomethyl) methyl phosphate, and mixtures thereof.

19. The electrochemical cell of claim 17 wherein propylene carbonate, butylene carbonate and vinylene carbonate.

20. The electrochemical cell of claim 19 wherein the ethylene carbonate is in the range of about 20% to about 50%, the dimethyl carbonate is in the range of about 12% to about 75%, the ethyl methyl carbonate is in the range of about 5% to about 45%, and the diethyl carbonate is in the range of about 3% to about 45%, by molar.

21. The electrochemical cell of claim 17 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

22. An electrochemical cell, which comprises:
a) an anode of a carbonaceous material capable of intercalating lithium;
b) a cathode comprising lithium cobalt oxide; and
c) a nonaqueous electrolyte activating the anode and the cathode, the nonaqueous electrolyte comprising a phosphate additive of the formula: $(R^1O)P(=O)(OR^2)$ (OR³) with R¹, R² and R³ being the same or different, wherein at least one of the R groups contains:
  i) at least three carbon atoms and has a first structure of the type C(sp)-C(sp³), wherein the C(sp³) is directly connected to the —OPO— functional group; or
  ii) at least three carbon atoms and has a second structure of the type C(sp²)-C(sp³), wherein the C(sp³) is directly connected to the —OPO— functional group; and
e) any remaining R group that is not i) or ii) is selected from the group consisting of hydrogen, saturated organic groups containing 1 to 13 carbon atoms, and unsaturated organic groups containing 2 to 13 carbon atoms.

23. A method for providing an electrochemical cell, comprising the steps of:
  a) providing a negative electrode which intercalates with an alkali metal;
  b) providing a positive electrode comprising an electrode active material which intercalates with the alkali metal;
  c) activating the negative and positive electrodes with a nonaqueous electrolyte; and
  d) providing a phosphate additive in the electrolyte, wherein the phosphate additive has the formula: (R¹O)P(=O)(OR²)(OR³) with R¹, R² and R³ being the same or different, wherein at least one of the R groups contains:
    i) at least three carbon atoms and has a first structure of the type C(sp)-C(sp³), wherein the C(sp³) is directly connected to the —OPO— functional group; or
    ii) at least three carbon atoms and has a second structure of the type C(sp²)-C(sp³), wherein the C(sp³) is directly connected to the —OPO— functional group; and
  e) any remaining R group that is not i) or ii) is selected from the group consisting of hydxogen, saturated organic groups containing 1 to 13 carbon atoms, and unsaturated organic groups containing 2 to 13 carbon atoms.

24. The method of claim 23 including selecting the phosphate additive from the group consisting of benzyl phosphate, benzyl dimethyl phosphate, allyl phosphate, ally dimethyl phosphate, dibenzyl phosphate, dibenzyl methyl phosphate, diallyl phosphate, diallyl methyl phosphate, tribenzyl phosphate, triallyl phosphate, dimethyl nitromethyl phosphate, propargyl phosphate, dipropargyl phosphate, tripropargyl phosphate, dimethyl propargyl phosphate, cyanomethyl dimethyl phosphate, di(cyanomethyl) methyl phosphate, and mixtures thereof.

25. The method of claim 23 wherein the phosphate additive is present in the electrolyte in a range of about 0.001M to about 0.40M.

26. The method of claim 23 including providing the electrolyte comprising a quaternary, nonaqueous carbonate solvent mixture.

27. The method of claim 23 including providing the electrolyte comprising at least one linear carbonate selected from the group consisting of dimethyl carbonate, diethyl carbonate, dipropyl carbonate, ethyl methyl carbonate, methyl propyl carbonate, ethyl propyl carbonate, and mixtures thereof.

28. The method of claim 27 including providing the electrolyte comprising at least three of the linear carbonates.

29. The method of claim 23 including providing the electrolyte comprising at least one cyclic carbonate selected from the group consisting of ethylene carbonate, propylene carbonate, butylene carbonate, vinylene carbonate, and mixtures thereof.

30. The method of claim 23 wherein the electrolyte including a carbonate mixture of dimethyl carbonate (DMC), ethyl methyl carbonate (EMC) and diethyl carbonate (DEC), wherein with the negative electrode deintercalated with the alkali metal and the positive electrode intercalated with the alkali metal before being activated with the electrolyte, the dimethyl carbonate, ethyl methyl carbonate and diethyl carbonate are in an essentially equilibrated molar mixture as determined by the graph of FIG. 1, wherein from a beginning molar mixture of DMC and DEC solvents in a ratio of a% of DMC and 1-a% of DEC entered on the abscissa of the graph and then from the a(DMC)% point moving up the y-intersect to determine the equilibrated molar mixture by intersecting curve 10 to get the equilibrated molar percentage of DMC, intersecting curve 12 to get the equilibrated molar percentage of EMC and intersecting curve 14 to get the equilibrated molar percentage of DEC, and
  wherein the cell is repeatedly cyclable between a discharged and a charged state with the dimethyl carbonate, the ethyl methyl carbonate and the diethyl carbonate remaining in the equilibrated molar mixture and wherein in the equilibrated molar mixture, the rate at which ethyl methyl carbonate is producible from dimethyl carbonate and diethyl carbonate by an ester exchange reaction is essentially equal to the rate at which ethyl methyl carbonate is disproportionable into dimethyl carbonate and diethyl carbonate such that the equilibrated molar mixture of dimethyl carbonate, diethyl carbonate and ethyl methyl carbonate essentially does not change as the cell discharges.

31. The method of claim 23 including providing the electrolyte comprising ethylene carbonate in the range of about 20% to about 50%, dimethyl carbonate in the range of about 12% to about 75%, ethyl methyl carbonate in the range of about 5% to about 45%, and diethyl carbonate in the range of about 3% to about 45%, by molar.

32. The method of claim 23 including providing the electrolyte having an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_2$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

33. The method of claim 23 including providing the alkali metal as lithium.

34. The method of claim 23 including providing the positive electrode comprising a positive electrode active material selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

35. The method of claim 23 including providing the negative electrode comprising a negative electrode active material selected from the group consisting of coke, carbon black, graphite, acetylene black, carbon fibers, glassy carbon, and mixtures thereof.

* * * * *

UNITED STATES PATENT AND TRADEMARK OFFICE
CERTIFICATE OF CORRECTION

PATENT NO. : 6,919,141 B2
DATED : July 19, 2005
INVENTOR(S) : Gan et al.

It is certified that error appears in the above-identified patent and that said Letters Patent is hereby corrected as shown below:

Delete drawing sheet, and substitute therefor drawing sheet, attached.

Column 12,
Lines 48-49, "wherein propylene carbonate, butylene carbonate and vinylene carbonte" should read:
-- wherein the electrodlyte further includes at least one cyclic carbonate selected from the group consisting of ethylene carbonate, propylene carbonate, butylene carbonate and vinylene carbonate --; and Column 13,
Lines 43-44, "ally dimethyl phosphate" should read -- allyl dimethyl phosphate --.

Signed and Sealed this

Eighteenth Day of October, 2005

JON W. DUDAS
*Director of the United States Patent and Trademark Office*